United States Patent
Servis et al.

(10) Patent No.: US 11,724,213 B2
(45) Date of Patent: Aug. 15, 2023

(54) MODULAR, DISPOSABLE 3D PRINTED MICROFLUIDIC MEMBRANE SYSTEM FOR SEPARATION AND PURIFICATION

(71) Applicant: Lawrence Livermore National Security, LLC, Livermore, CA (US)

(72) Inventors: Anna G. Servis, Livermore, CA (US); Narek Gharibyan, Livermore, CA (US); Kenton J. Moody, Livermore, CA (US); Tashi Parsons-Davis, Antioch, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 16/803,393

(22) Filed: Feb. 27, 2020

(65) Prior Publication Data
US 2021/0268403 A1    Sep. 2, 2021

(51) Int. Cl.
*B01D 11/04*     (2006.01)
*B01D 63/08*     (2006.01)
(Continued)

(52) U.S. Cl.
CPC .......... *B01D 11/0496* (2013.01); *B01D 59/02* (2013.01); *B01D 61/147* (2013.01);
(Continued)

(58) Field of Classification Search
CPC . B01D 11/0496; B01D 61/147; B01D 63/088
See application file for complete search history.

(56) References Cited

U.S. PATENT DOCUMENTS 5,961,832 A * 10/1999 Shaw ................. B01D 11/0415
    210/634
2004/0181101 A1* 9/2004 Fanselow ................ C07C 29/86
    568/913
(Continued)

FOREIGN PATENT DOCUMENTS

| CN | 103203258 A | * | 7/2013 | |
| CN | 206444459 U | * | 8/2017 | |
| WO | WO-2017069770 A1 | * | 4/2017 | ......... B01D 39/1692 |

OTHER PUBLICATIONS

Bhattacharjee, Nirveek, et al. "The upcoming 3D-printing revolution in microfluidics." Lab on a Chip 16.10 (2016): 1720-1742. (Year: 2016).*

(Continued)

*Primary Examiner* — Bradley R Spies
(74) *Attorney, Agent, or Firm* — Harness, Dickey & Pierce, P.L.C.

(57) ABSTRACT

The present disclosure relates to a membrane extraction apparatus for extracting a component from a first liquid. The apparatus may incorporate a housing comprised of first and second mating housing halves, with each housing half having an open faced channel formed therein such that the channels at least partially overlay one another when the two housing halves are secured together. A membrane filter is disposed between the two housing halves to overlay the open faced channels. The membrane filter extracts the component from the first liquid and transfers the component into the second liquid as the first and second liquids flow through the first and second housing halves.

11 Claims, 6 Drawing Sheets

(51) Int. Cl.
  *B33Y 80/00* (2015.01)
  *B01D 59/02* (2006.01)
  *B01D 61/14* (2006.01)

(52) U.S. Cl.
  CPC ...... *B01D 63/088* (2013.01); *B01D 2325/028* (2013.01); *B33Y 80/00* (2014.12)

(56) References Cited

U.S. PATENT DOCUMENTS

| | | | | |
|---|---|---|---|---|
| 2011/0253629 | A1* | 10/2011 | Jovanovic | B01D 61/18 210/646 |
| 2013/0090488 | A1* | 4/2013 | Dietz | C11B 3/04 554/185 |
| 2014/0179021 | A1* | 6/2014 | Parkinson | B01J 19/0093 436/177 |
| 2016/0051935 | A1* | 2/2016 | Li | B01D 69/10 210/797 |
| 2018/0272284 | A1* | 9/2018 | Barcedo | B01D 67/0002 |

OTHER PUBLICATIONS

Wang Niejun—CN-103203258-A Machine Translation—Jul. 2013 (Year: 2013).*
Wu H—CN-206444459-U—Aug. 2017 (Year: 2017).*
Jonsson, Jan Ake et al. "Membrane extraction in analytical chemistry", J. Sep. Sci., 2001, 24, pp. 495-507.
Mariet, Clarisse et al. "Microfluidics devices applied to radionuclides separation in acidic media for the nuclear fuel cycle", Micro and Nano Engineering 3 (2019), pp. 7-14.
Ciceri, Davide et al. "The use of microfluidic devices in solvent extraction", J Chem Technol Biotechnol (2014), 89, pp. 771-786.
Hotokezaka, Hiroyasu et al. "Development of the Innovative Nuclide Separation System For High-Level Radioactive Waste Using Microchannel Chip—Extraction Behavior of Metal Ions From Aqueous Phase to Organic Phase in Microchannel", Progress in Nuclear Energy, vol. 47, No. 1-4, 2005, pp. 439-447.
Martini, Petra et al. "Perspectives on the Use of Liquid Extraction for Radioisotope Purification", Molecules, 24, 334, 2019, pp. 1-17.

* cited by examiner

MODULAR, DISPOSABLE 3D PRINTED MICROFLUIDIC MEMBRANE SYSTEM FOR SEPARATION AND PURIFICATION

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to microfluidic systems and methods, and more particularly systems and methods for microscale separation and purification of analytes by continuous flow membrane extraction by a disposable 3D printed microfluidic apparatus.

BACKGROUND

The statements in this section merely provide background information related to the present disclosure and may not constitute prior art.

The separation and purification of small volumes of radionuclides in solution from complex mixtures is an essential process in the routine quantification of trace amounts of metal ions for nuclear safeguards and nuclear forensic applications. Another important application where such separation and purification is extremely important is in the isolation and recovery of medical radioisotopes for imaging and cancer diagnosis and treatment.

Early methods that were used to isolate radionuclides relied on liquid-liquid extraction, where the separation of components in a mixture is based on differences in solubility between two immiscible liquid phases. Such methods, however, have been abandoned in part because of their difficulty in being implemented effectively, and also because of their difficulty in being implemented through automation at a laboratory scale. Currently, analytical separation methods involved in the processing of radionuclides are dominated by the use of ion exchange or extraction chromatography to achieve separation of radionuclides from aqueous solutions through their selective adsorption to a stationary phase.

Column chromatography is convenient for laboratory-scale separations because of its versatility, including the ability to maintain small, milliliter to sub-milliliter-scale separation volumes. The same column setup can be used with different solid packing materials for separations of mixtures of highly varied compositions, and the volume of the final sample is limited only by the free column volume of the resin bed. After its use, the contaminated column and packing materials can be disposed of as waste due to their low cost and availability. However, there are limitations to the minimum column size (and therefore the minimum sample size) as it must be greater than the size of the resin particulates, and the loading capacity of columns is small compared to an equivalent volume of liquid in a liquid-liquid extraction system. Furthermore, the performance of chromatographic separations can degrade significantly when samples contain high concentrations of interfering metal ions, as well as during operations at high liquid flow rates. These limitations have important negative impacts on the efficacy of a given separation in chromatographic systems.

In recent years, microscale flow-through implementations of liquid-liquid extraction have been considered for radionuclide separations (Ciceri 2014, Hotokezaka 2006, Mariet 2019, Martini 2019). However, the focus has been on droplet or parallel flow-based extraction devices. In droplet extraction, alternating droplets of an aqueous feed and immiscible organic extractant solution are produced in a microfluidic channel and allowed to remain in contact while the component being extracted is selectively transferred to the organic phase. This configuration is effective for performing single stage contacts but is challenging to implement in multiple stages since each stage requires its own pump. In parallel flow extraction, the aqueous and organic phases are allowed to flow parallel to each other in a long channel forming a horizontal interface through which the analyte of interest is extracted. The flow conditions under which this horizontal interface forms are limited and must be maintained precisely to preserve the stability of the interface. Both types of devices require two stages in series to first extract the component of interest into the organic phase, and then strip it back into an aqueous phase.

Membrane extraction offers attractive alternative microscale liquid-liquid extraction geometry in comparison to droplet and parallel-flow configurations. The term "membrane extraction" can refer to a variety of membrane-assisted extraction geometries, including the transfer of a component from an aqueous feed to an organic phase across a membrane that serves to stabilize the interface between the two phases, and the transfer of a component from an aqueous feed to an aqueous strip by an organic phase supported in the pores of a hydrophobic membrane. The former is referred to as microporous membrane liquid-liquid extraction (MMLLE) and the latter is known as supported liquid membrane (SLM) extraction. The use of membranes for analytical and industrial scale liquid-liquid extraction separations has been established in the scientific literature (Jonsson 2001). Literature examples of microscale membrane extraction are limited to examples of stable molecules or ions extracted in a single-stage, custom machined device made from expensive fluorinated polymers or metals with poor chemical resistance. However, multistage membrane extraction has not been demonstrated for use in laboratory-scale separations or medical radioisotope production despite its advantages over column chromatography methods.

SUMMARY

This section provides a general summary of the disclosure, and is not a comprehensive disclosure of its full scope or all of its features.

In one aspect the present disclosure relates to a membrane extraction apparatus for extracting a component from a first liquid. The apparatus may comprise a housing comprised of a first housing half and a mating second housing half. The first housing half has a first open faced channel configured to flow the first liquid through the first housing half from a first inlet port to a first outlet port. The second housing half has a second open faced channel configured to flow a second liquid through the second housing half from a second inlet port to a second outlet port thereof, simultaneously with a flow of the first liquid through the first housing half. The second open faced channel is further arranged to at least partially overlay the first open faced channel when the first and second housing halves are secured together in facing relationship. A membrane filter is disposed between the first and second housing halves to overlay the first and second open faced channels and communicates with the first and second open faced channels. The membrane filter operates to extract the component from the first liquid and to transfer the component into the second liquid as the first and second liquids flow through the first and second housing halves.

In another aspect the present disclosure relates to a modular membrane extraction apparatus for extracting a component from a first liquid. The apparatus comprises a housing comprised of a first housing half and a mating second housing half. The first housing half has a first open faced channel formed within a projecting portion and is configured to flow the first liquid through the first housing half from a first inlet port to a first outlet port. The second housing half has a second open faced channel formed within a recessed portion, where the recessed portion registers with the projecting portion. The second open faced channel is configured to flow a second liquid through the second housing half from a second inlet port to a second outlet port, simultaneously while the first fluid is flowing through the first housing half. The second open faced channel is further arranged to communicate with the first open faced channel when the first and second housing halves are secured together. A porous membrane filter is disposed between the projecting and recessed portions of the first and second housing halves, respectively, to overlay the first and second open faced channels and to communicate with the first and second open faced channels. The membrane filter operates to extract the component from the first liquid and to transfer the component into the second liquid as the first and second liquids simultaneously flow through the first and second housing halves.

In still another aspect the present disclosure relates to a method of extracting a component in a first fluid using a second fluid. The method may comprise providing first and second housing halves each having open faced channels which overlay one another when the first and second housing halves are secured together. The method may further include disposing a porous membrane filter over the open faced channels before securing the first and second housing halves together such that the porous membrane filter is captured between the first and second open faced channels and in communication with both of the open faced channels. The method may further include flowing the first fluid through the open faced channel in the first housing half such that the first fluid contacts the porous membrane filter while flowing from a first inlet to a first outlet of the first housing half. The method may further include simultaneously flowing a second fluid through the open faced channel in the second housing half such that the second fluid flows from a second inlet to a second outlet of the second housing half and communicates with the porous membrane filter while the first fluid is in contact with the porous membrane filter. The method may further include using the porous membrane filter to extract the component from the first fluid and to transfer the component to the second fluid, and continuing to flow the first and second fluids out from the first and second housing halves.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

FIG. 5b is an end view of the first housing half of FIG. 5a taken in accordance with directional line 5b-5b in FIG. 5a;

FIG. 6b is an end view of just the second housing half taken in accordance with the directional line 6b-6b in FIG. 6a;

DETAILED DESCRIPTION

Example embodiments will now be described more fully with reference to the accompanying drawings.

The present disclosure relates to a 3D printed microfluidic apparatus and method that may be made using conventional polymer additive manufacturing ("AM") systems and methods. To assist with membrane extraction studies in a laboratory environment, the co-inventors constructed an embodiment of the apparatus of the present disclosure using a 3D printing system that made use of a commercially available 3D printer, ink, membranes, and related equipment typically used with 3D AM printing systems. The 3D printed apparatus was utilized for the separation of various analytes.

The advantages of the apparatus and method of the present disclosure over traditional separation methods and other microfluidic devices and methods are numerous and wide ranging. One such benefit is that the liquid-liquid interface is stable under varying flow conditions and flow rates, and can be optimized for a given separation application or to concentrate a sample. The number of pumps required for multistage operation is reduced over other microfluidic methods. Another benefit is the flexibility that the apparatus provides in configuring a plurality of the apparatuses in series or even in parallel configurations, or series/parallel configurations. Multiple modules can be connected in series for a multi-step separation requiring only one additional pump per module. This eliminates the need for a separate step to transfer the sample to another apparatus. Still another benefit is that the amounts of in-going and out-going hazardous materials are significantly reduced over traditional separation methods. This makes the various embodiments of the apparatus and method of the present disclosure especially attractive for applications where measurements must be made in the field. Still another benefit is that the small volumes of reagents required enable the use of highly selective, custom-synthesized extractants to target specific analytes in separations of complex mixtures.

Figure 1:
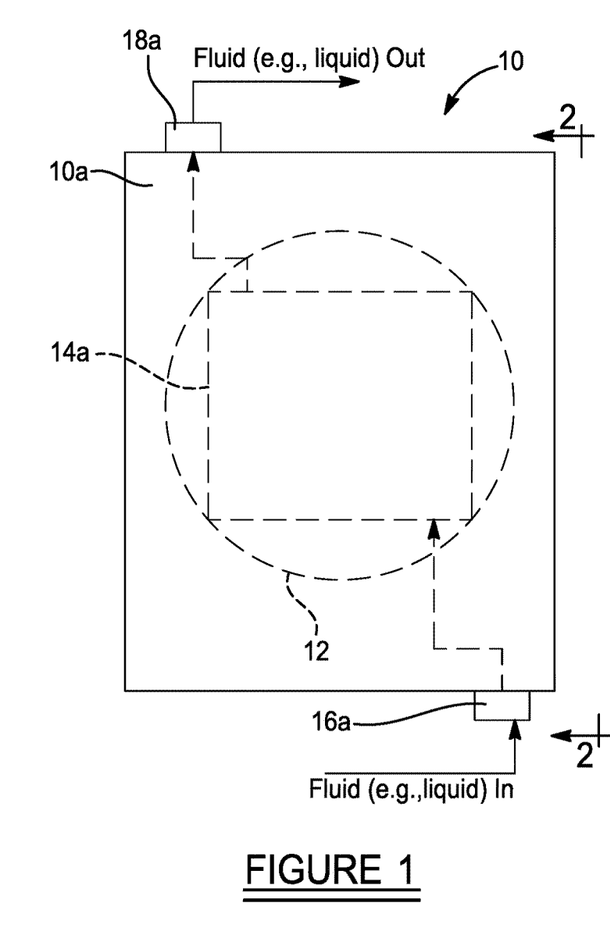
FIG. 1 is a plan view of the apparatus indicating the internal, microscale open channels in highly simplified form using dashed lines.
Figures 2, 3:
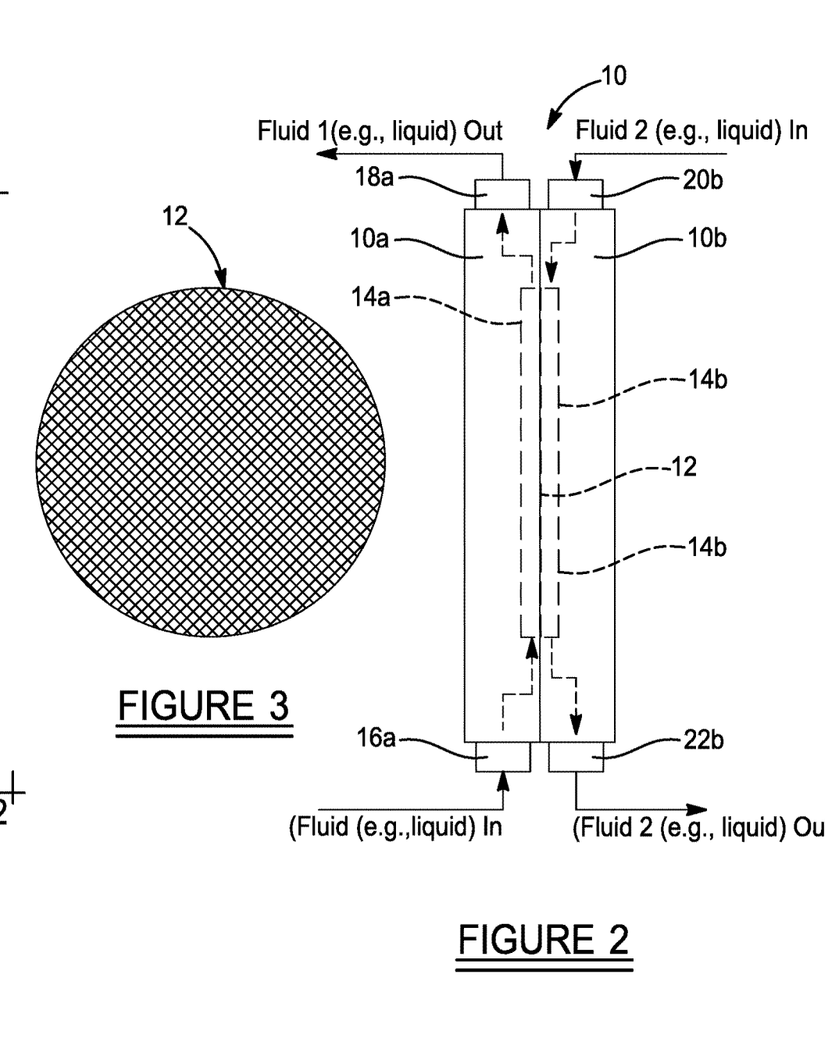
FIG. 2 is a side view of the apparatus in accordance with directional line 2-2 in FIG. 1, indicating the two housing halves of the apparatus secured together.
FIG. 3 is a highly simplified plan view of a membrane element that is captured and held between the two housing halves of FIG. 2.

Referring to FIGS. 1 and 2, one embodiment of a modular membrane extraction apparatus 10 (hereinafter simply "apparatus 10") is shown. In this example the apparatus 10 is comprised of two (or optionally more than two) 3D printed housing halves 10a and 10b in which one or more flat hydrophobic or hydrophilic porous membrane filters 12 are clamped between shallow, microscale, open faced channels 14a and 14b. FIG. 3 shows a highly simplified view of the membrane filter 12, which in this example is a single membrane filter having a round shape. The thickness of the membrane filter 12 may vary considerably, but in most instances a thickness of between about 0.025 mm-0.125 mm may be preferred. The membrane filter 12 may be a commercially available membrane filter, for example a porous, polymer film membrane filter commercially available from any number of companies such as, but not limited to, Advantec MFS, Inc. of Dublin, Calif., or Sterlitech Corporation of Kent, Wash. While the membrane filter 12 is shown as round-shaped in this example, it need not be round in shape, but only requires a shape sufficient to cover the open faced channels 14a and 14b. In one embodiment the membrane 12 may be a PTFE (polytetrafluoroethylene) porous membrane with 0.2 µm available from Advantec MFS, Inc.

The housing half 10a includes a fluid inlet fitting 16a and a fluid outlet fitting 18a. The inlet fitting 16a may be coupled to a suitable tube for receiving a fluid flow (e.g., a liquid flow) that requires purification. The outlet fitting 18a may be coupled to a reservoir (not shown) or to another apparatus 10 if more than one unit (or copy) of the apparatus is being employed. The fluid inlet fitting 16a and the fluid outlet fitting 18a communicate with the open faced channel 14a to enable a fluid to be flowed through the housing half 10a. As the fluid flows through the open faced channel 14a in a first direction the fluid is in contact with the membrane filter 12.

The housing half 10b likewise has a fluid inlet fitting 20b and a fluid outlet fitting 22b that communicate with one another and with the open faced channel 14b, such that fluid may flow in a second direction through the open faced channel 14b from the inlet fitting 20b to the outlet fitting 22b. While the direction of fluid flow through the housing half 10b in this example is in the opposite direction to that of the fluid flowing through the housing half 10a, the fluid flows do not necessarily need to be in the opposite direction. The important consideration is that the fluid flows through both of the open faced channels 14a and 14b make contact with the membrane filter 12 as they travel through the apparatus 10. The fittings 16a, 18a, 20b and 22b may be interfaced to conventional tubing, for example polymer capillary tubing, using commercially available threaded tubing connectors.

The open faced channels 14a and 14b may vary in depth, but in most applications a depth of between about 50 µm and 400 µm for each open faced channel 14a and 14b will likely be suitable, and in many applications a depth of less than 250 µm is expected to be preferred. In this example the depths are the same, but it is possible that the depth of one of the open faced channels 14a and 14b could be greater than the other. The open-faced channels 14a and 14b in this example form a serpentine flow path having a substantially U-shape cross-section, although other flow paths and other cross-sectional shapes are possible, and the present disclosure is not limited to use with any particular style of flow path or cross-sectional shape. In one embodiment the open faced channels 14a and 14b are much wider than they are deep, and in some embodiments may have width-to-depth ratios ranging from 3:1 to 13:1, or possibly even wider or narrower than these ratios. Accordingly, the configuration of the open faced channels 14a and 14b may vary considerably, and the present disclosure is not limited to use with channels of any particular width-to-depth ratio, or even any particular cross-sectional shape.

Figure 4:
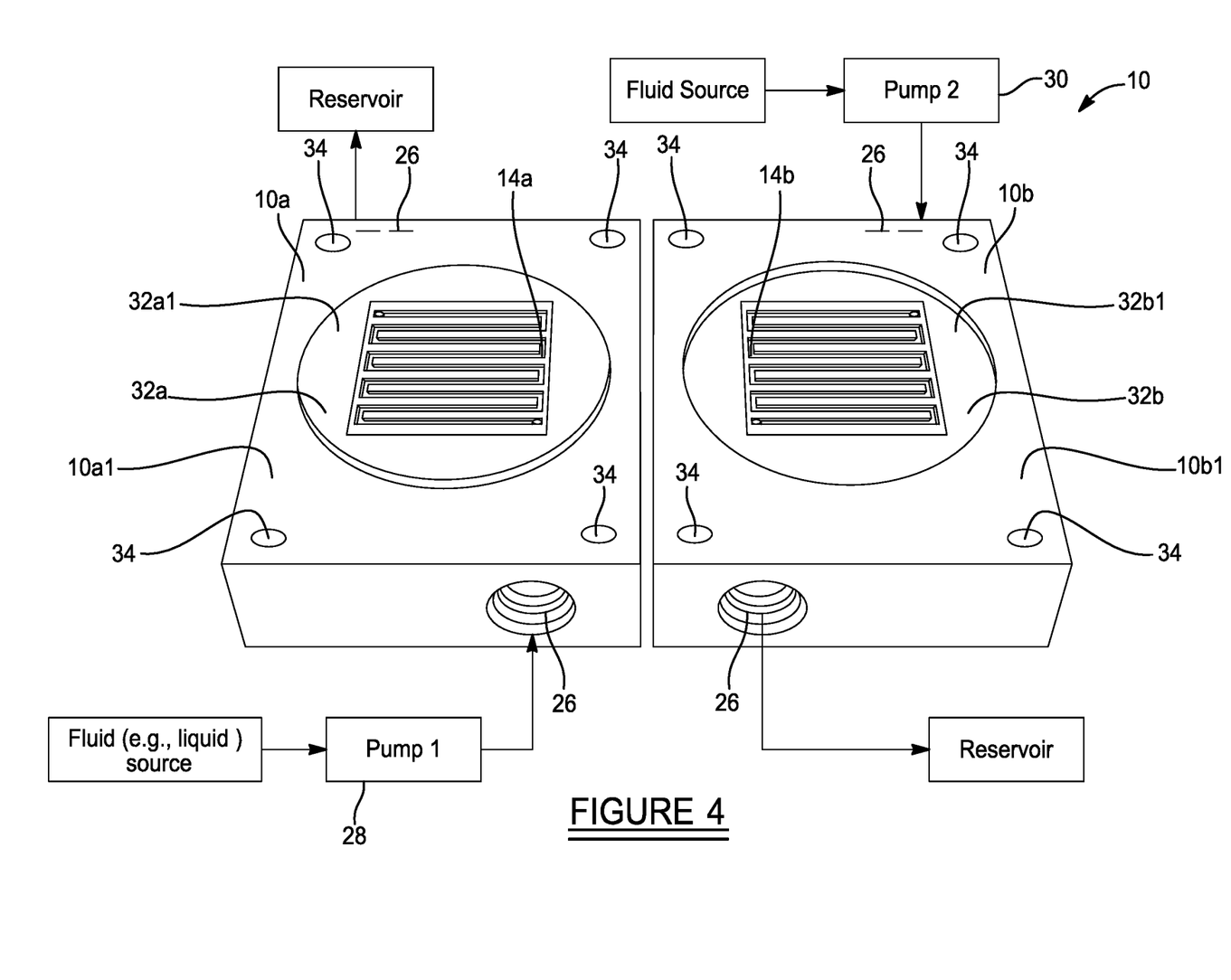
FIG. 4 is a highly simplified schematic perspective view of the two housing halves of the apparatus separated, showing the internal, serpentine, open flow channels that communicate with the membrane when fluids are flowing through each of the housing halves.

Referring to FIG. 4, the two housing halves 10a and 10b are shown separated without the membrane filter 12 and without the inlet and outlet fittings 16a, 18a, 20b, 22b. FIGS. 5a, 5b, 6a and 6b show the housing halves 10a and 10b separated from one another but with the inlet and outlet fittings 16a, 18a, 20b and 22b attached. The housing halves 10a and 10b each have a planar inner surface 10a1 and 10b1 within which a circular projection 32a and a circular recess 32b, respectively, are formed. The apparatus 10 may be constructed of varying dimensions and shapes without departing from the scope of the present disclosure.

In FIG. 4 the threaded ports 26 may be used to enable easy attachment and removal of the inlet and outlet fittings 16a, 18a, 20b and 22b, assuming the inlet and outlet fittings also include threaded male ends. Delivery of the fluids (e.g., liquids) to the housing halves 10a and 10b may be achieved by pumps 28 and 30 shown in FIG. 4. The inlet and outlet fittings 16a, 18a, and 20b and 22b help to lend a "modular" construction to the apparatus 10 which enables two or more apparatuses 10 to be connected in series, or in parallel, or even in series/parallel configurations, to best meet the needs of specific applications.

Figure 5A:
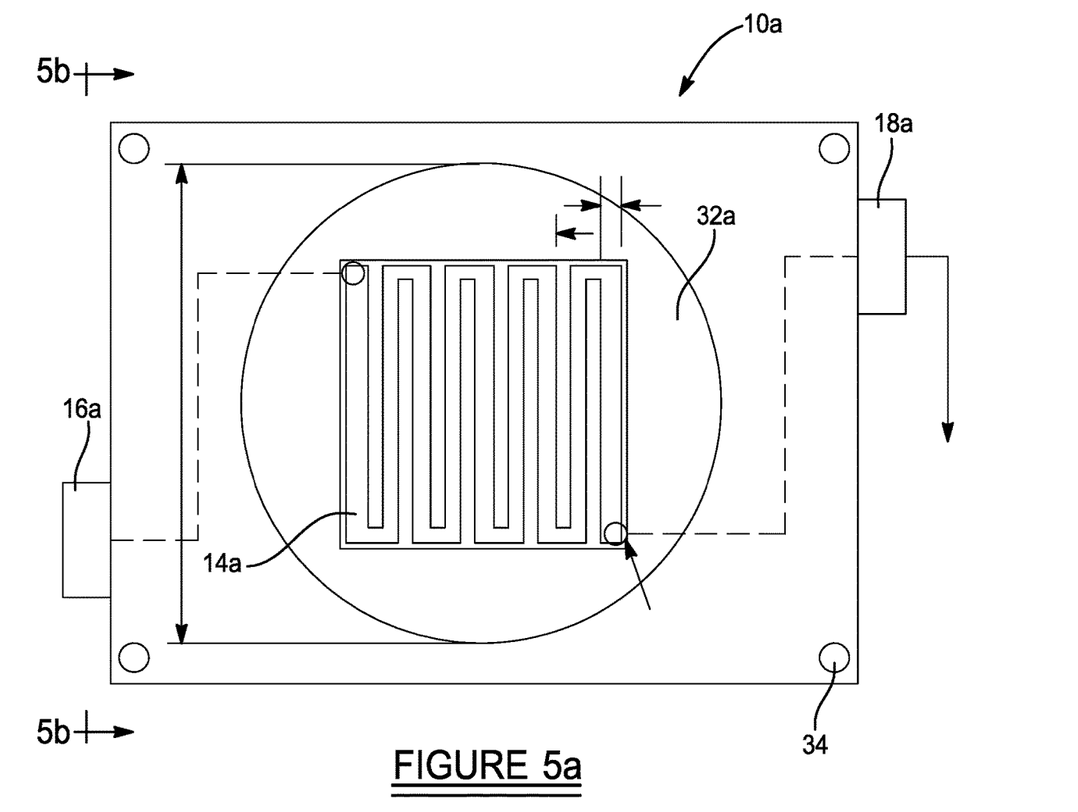
FIG. 5a is a plan view of just the first housing half.
Figure 5B:
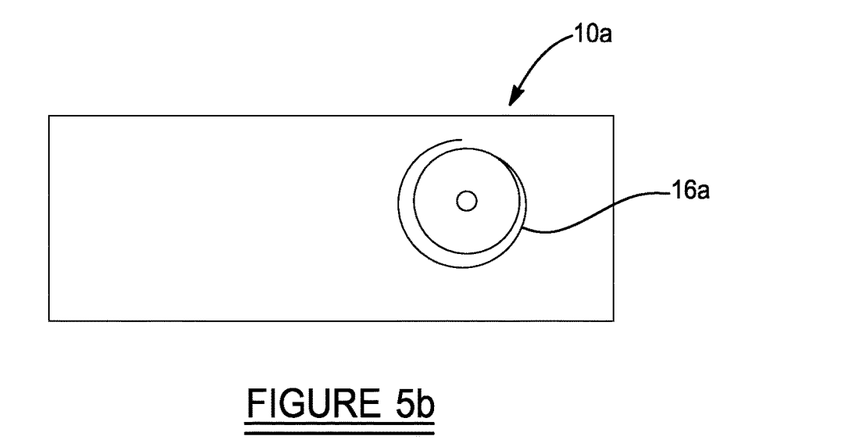
Figure 6A:
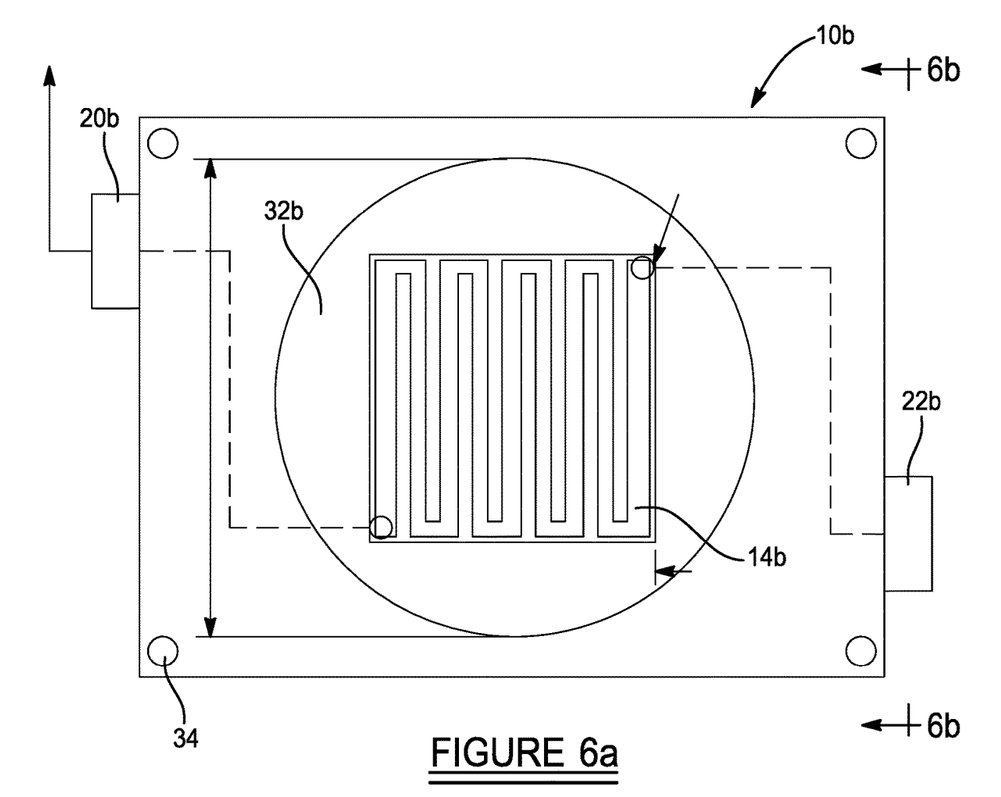
FIG. 6a is a plan view of just the second housing half.
Figure 6B:
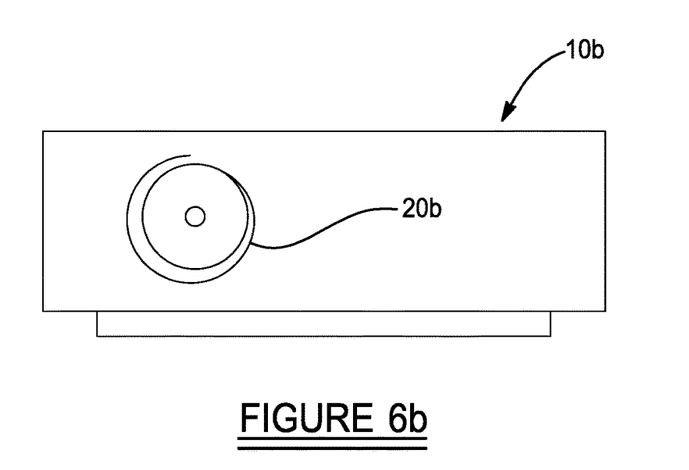

FIGS. 4, 5a and 6a also show the open faced channels 14a and 14b in greater detail. The open faced channels 14a and 14b are each formed within planar walls 32a1 and 32b1, respectively of the circular projection 32a and the circular recess 32b, respectively, of their respective housing half 10a or 10b. In this manner the upper edges of the open faced channels 14a and 14b are generally coplanar with their respective planar recessed walls 32a1 and 32b1. The portions 32a and 32b further each have a shape and diameter to accommodate the membrane filter 12. In this way the membrane 14 may be captured between the portions 32a and 32b when the housing halves 10a and 10b are secured together. It has been found that the membrane filter 12 helps to provide a seal which is sufficient to prevent leakage of fluids when secured between the housing halves 10a and 10b. However, incorporating a separate O-ring groove around each of the portions 32a and 32b, and an elastomer (or rubber) O-ring, could easily be incorporated in the apparatus 10 to further ensure a leak free seal between the membrane filter 12 and the housing halves 10a and 10b. A plurality of separate through bores 34 may be formed in the housing halves 10a and 10b and separate threaded fasteners used to secure the housing halves 10a and 10b together. Optionally, the housing halves 10a and 10b could be secured together using a suitable adhesive around the circular portions 32a and 32b or at one or more other areas of the housing halves 10a and 10b.

It will be appreciated that the open faced channels 14a and 14b are designed to register (i.e., perfectly overlay one another) when the two housing halves 10a and 10b are assembled together. The fluids entering each housing half 10a and 10b form separate streams that flow in the same path, and over the same area of the enclosed membrane filter 12, allowing for transport of a component (e.g., analyte) carried in one of the fluid streams, by use of the membrane filter, to the other fluid stream. Optimally, the two fluid streams flow in a countercurrent configuration to maximize transfer of the desired analytes between phases by replicating the performance of a multistage extraction contact.

In one example the two fluid streams are liquid streams supplied to the apparatus 10 in an aqueous phase (e.g., flowing into the housing half 10a) and an immiscible organic extractant phase (e.g., flowing into the housing half 10b). The membrane filter 12 may be either a hydrophobic or a hydrophilic porous membrane to stabilize the interface in this configuration. For supported liquid membrane (SLM) extraction, the two liquid streams are an aqueous feed stream and an aqueous strip stream. The enclosed membrane filter 12, which must be hydrophobic in this application, is loaded with an organic extractant solution prior to pumping the two aqueous streams through the apparatus 10.

Figure 7:
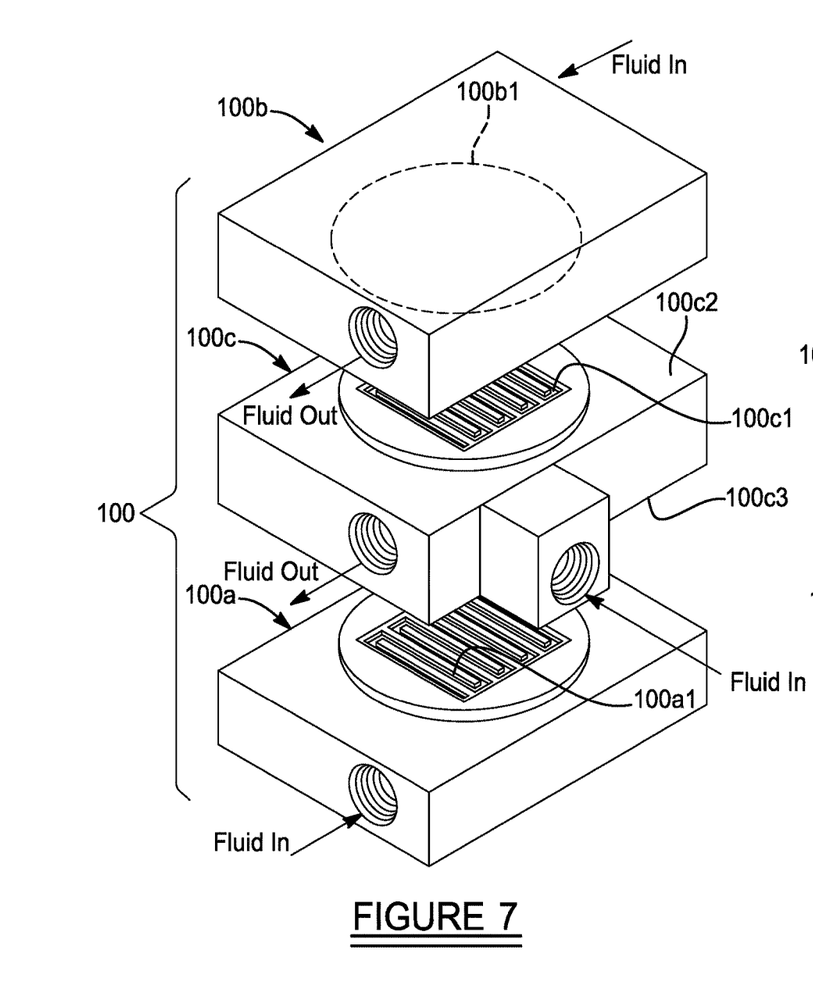
FIG. 7 is an exploded perspective view of the individual components that make up a separation tower in accordance with another embodiment of the present disclosure, which enables two separation stages to be formed in series.
Figure 8:
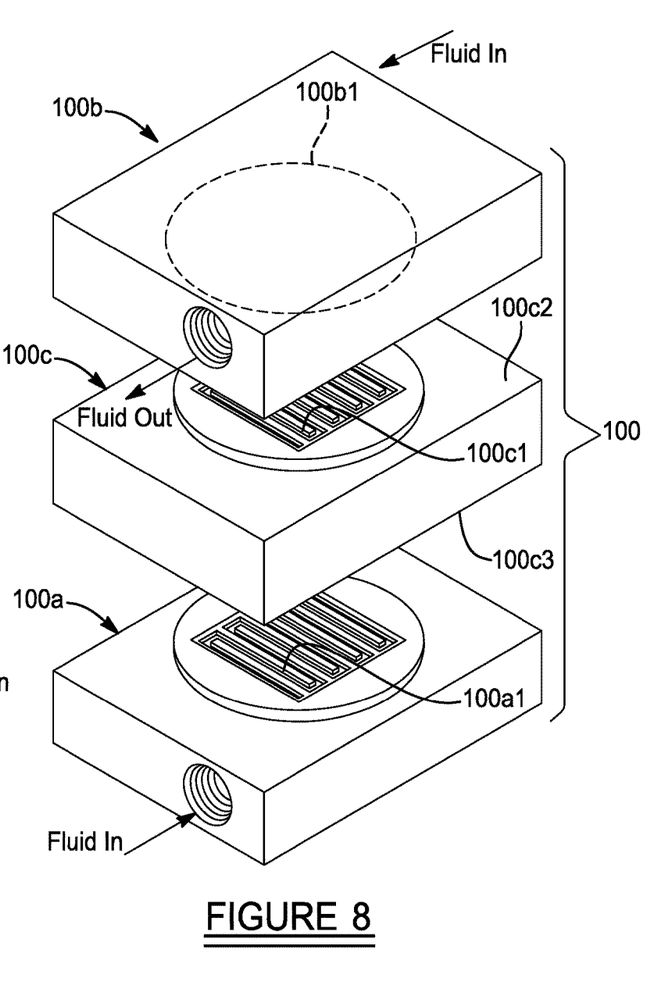
FIG. 8 is an exploded perspective view of the two stage separation tower of FIG. 7 but with the center section rotated 180 degrees.

For separations requiring multiple extraction contacts with multiple extractants, a system may be formed using several separate ones of the apparatus 10 combined into a series flow path, and where the enclosed membrane filter 12 of each apparatus 10 is loaded with a different extractant from the others. No additional pumps are needed to control flow through such a system making use of two or more of the apparatuses 10, except possibly where solutions of differing compositions are required. Membrane extraction in series can be achieved either by attaching multiple single stage apparatuses 10 together with tubing and threaded connectors, or by adding a two-sided open channel piece to the middle of the single stage module formed by 10a and 10b, forming a single separation tower with two stages in series. This configuration is shown in FIGS. 7 and 8 with apparatus 100. In this embodiment a center section 100c having open faced channels 100c1 is secured between outer sections 100a and 100b. The center section 100c has the open faced channels 100c1 formed on both of its opposing sides 100c2 and 100c3 (although only open faced channels 100c1 are visible in FIGS. 7 and 8). Section 100a may be identical in construction to the housing half 10a, while section 100b may be identical to the housing half 10b. Thus, the open faced channels 100c1 on the side 100c3 of the center section 100c would register (i.e., line up) with the open faced channels 100a1 on section 100a, and the open faced channels 100b1 on section 100b would register with the open faced channels 100c1 on side 100c2 of the center section 100c. Thus, the apparatus 100 forms a single separation "tower" with fluid flow paths through each of the sections 100a, 100b and center section 100c. Separate membrane filters (not shown) would be captured between the sections 100b/100c and 100a/100c, so as to be held between aligned channel sections 100a1/100c1, and 100b1/100c1.

Figure 9:
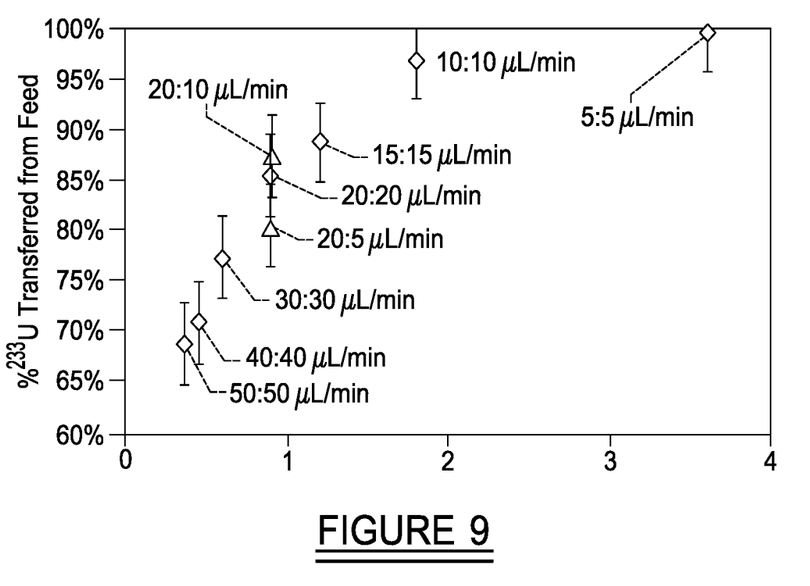
FIG. 9 is a graph showing test results using apparatus of FIG. 1 for uranium extraction, in this example with 100 μm channel depths in each of the housing halves of the apparatus, and which shows increases in the extraction with decreasing flow rate (and where flow rates are indicated as data labels where the first number of each number pair is the feed flow rate and the second number is the strip flow rate; error bars correspond to an estimated absolute uncertainty of ±4%)
Figure 10:
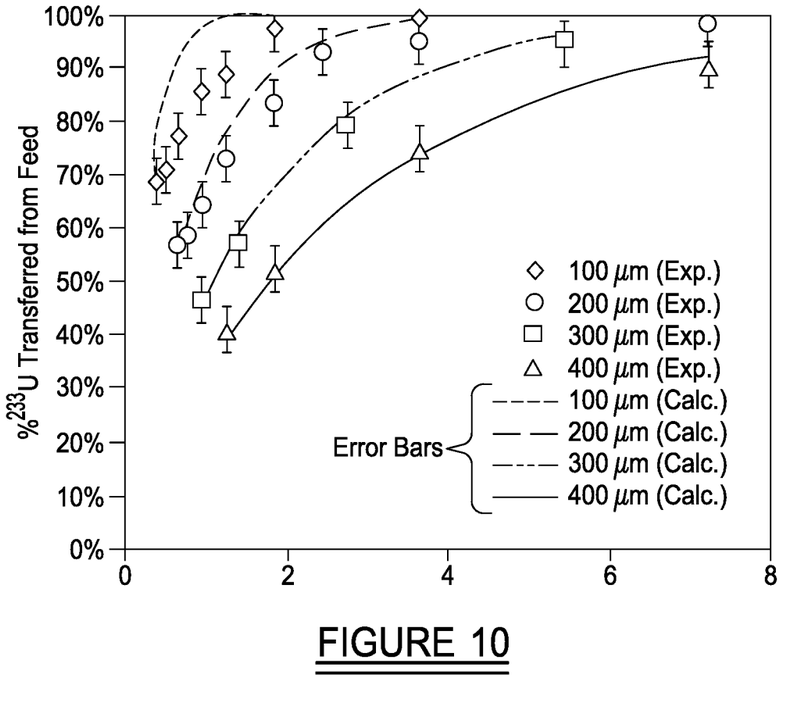
FIG. 10 shows graphs illustrating how the extent of uranium extraction in one embodiment of the apparatus decreases with increasing open-faced channel depth, and where the error bars correspond to an estimated absolute uncertainty of ±4%.

FIGS. 9 and 10 show experimental results for the extraction of uranium. In these test results the apparatus 10 was used for the extraction of 233U and demonstrated that extraction increases substantially with increasing residence time before starting to level out at approximately 90% (FIG. 9) uranium transferred from the feed to the strip. This trend can be explained by considering the changes in the uranium flux across the liquid membrane with changing composition. At high flow rates and low residence times, the uranium flux from the liquid feed stream to the strip flow stream remains high due to the large concentration gradients that are maintained over the full length of the open faced channels 14a/14b in the apparatus 10. The concentration of uranium in the liquid feed stream is still relatively high at the apparatus 10 exit under these conditions, resulting in a strong dependence of uranium extraction on residence time. When the extent of uranium extraction approaches 100%, the uranium concentration in the liquid feed stream is low for much of the length near the outlet of the apparatus 10 open faced channels 14a/14b, resulting in lower uranium fluxes at those points and a leveling off of the change in uranium extraction with residence time. If the strip flow rate is decreased relative the feed flow rate, the concentration of uranium in the strip increases while the extent of extraction remains the same or decreases slightly, as shown in FIG. 4 for 4:1 and 2:1 feed-to-strip flow rate ratios. These results demonstrate that the apparatus 10 can be used effectively to increase the concentration of the extracted components of a sample. This would be beneficial in the analysis of environmental samples, where increasing the concentration of trace components might improve a method's limit of detection.

For a given residence time in the apparatus 10, the recovery of 233U increases with decreasing channel depth, as shown in FIG. 10. The decrease in channel depth improves the extent of uranium extraction by affecting two different conditions in the apparatus 10. There is a decrease in volume, and therefore a decrease in the total amount of uranium that must pass through the membrane 12 to reach a certain extraction percentage. Furthermore, there is a decrease in the linear distance the uranium must travel from the base of the feed channel (e.g., channel 14a) to the base of the strip channel (e.g., channel 14b). Because the goal of applied chemical separations is to have the greatest throughput while maintaining acceptable purity and recovery levels, the shallowest channel depth, in this example, has the most desirable transport characteristics. For example, in the present experiments involving uranium, the 100 μm channel depths for the open faced channels 14a and 14b demonstrated the most favorable combination of fast flow rates and adequate recoveries.

A significant feature of the apparatus 10 is that the apparatus 10 can be made sufficiently cost effectively so that the entire apparatus 10 can be economically discarded after use. This is important and desirable as it eliminates the need (and cost) to decontaminate the apparatus 10, as well as eliminating the concern with long-term stability of the apparatus towards mineral acids and/or radiation fields. Three dimensional (3D) printing is particularly desirable for rapid, economical formation of the housing halves 10a and 10b, although the housing halves are not limited to construction only using 3D printing methods.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A membrane extraction apparatus for extracting a component from a first liquid, the apparatus comprising:
   a housing comprised of a first housing half and a mating second housing half;
   the first housing half having a first planar inner surface and the second housing half having a second planar inner surface;
   the first housing half having a first inlet port and a first outlet port formed within a first longitudinal plane extending through the first housing half, the first housing half further including a projecting portion including a planar wall, and a first open faced channel formed in the first planar wall such that upper walls of the first open faced channel are co-planar with the planar wall, the first housing half being configured to flow the first liquid in a first direction through the first housing half from the first inlet port to the first outlet port;
   the second housing half having a second inlet port and a second outlet port formed within a second longitudinal plane extending through the second housing half and parallel to the first longitudinal plane, the second housing half further including a recessed portion including a planar recessed wall formed in the second planar inner surface, and a second open faced channel formed in the recessed portion such that upper walls of the second open faced channel are co-planar with the planar recessed wall, the second housing half being configured to flow a second liquid through the second housing half in a second direction opposite to the first direction, from a second inlet port to a second outlet port thereof, simultaneously with a flow of the first liquid through the first housing half, the second open faced channel further being arranged to at least partially overlay the first open faced channel when the first and second housing halves are secured together in facing relationship;
   a membrane filter disposed between the first and second housing halves to overlay the first and second open faced channels and communicate with the first and second open faced channels, while enabling the first and second planar inner surfaces to contact one another when the first and second housing halves are assembled together;
   the membrane filter operating to extract the component from the first liquid and to transfer the component into the second liquid as the first and second liquids flow through the first and second housing halves in opposing flows in the first and second directions;
   the recessed portion of the second housing half having a depth sufficient to engage the projecting portion of the first housing half when the first and second housing halves are secured together;
   wherein the projecting and recessed portions are shaped in accordance with a two dimensional shape of the membrane filter to house the membrane filter therebetween;
   wherein the first open faced channel has a first serpentine flow path, the second open faced channel has a second serpentine flow path, and wherein the first and second open faced channels further are configured with a common serpentine shape to form mirror images of one another, and to overlay one another, when the first and second housing halves are secured together; and wherein the first inlet port and the first outlet port of the first housing half are arranged in a first plane parallel with a plane in which the first open faced channel resides; and wherein the second inlet port and the second outlet port of the second housing half are arranged in a second plane parallel with a plane in which the second open faced channel resides.

2. The apparatus of claim 1, wherein the first and second housing halves comprise 3D printed components.

3. The apparatus of claim 1, wherein the projecting and recessed portions each have a circular shape.

4. The apparatus of claim 3, wherein the membrane filter comprises a circular shape configured to reside in the recessed portion when the first and second housing halves are secured together.

5. The apparatus of claim 1, wherein the first and second open faced channels each have a depth of no more than 250 μm.

6. The apparatus of claim 1, wherein the membrane filter comprises a hydrophobic porous membrane filter.

7. The apparatus of claim 1, wherein the membrane filter comprises a hydrophilic porous membrane filter.

8. The apparatus of claim 1, further comprising an inlet fitting secured to the first inlet of the first housing half, and an outlet fitting secured to the first outlet of the first housing half on opposing sides of the first housing half, such that both the inlet fitting and the outlet fitting are in communication with the first open faced channel.

9. The apparatus of claim 1, further comprising an inlet fitting secured to the second inlet of the second housing half, and an outlet fitting secured to the second outlet of the second housing half on opposing sides of the second housing half, such that both the inlet fitting and the outlet fitting are in communication with the second open faced channel.

10. A method of extracting a component in a first fluid using a second fluid, the method comprising:

providing first and second housing halves, having a projecting portion and a recessed portion, respectively, and each having open faced channels which form first and second serpentine flow paths, respectively, and which are mirror images of one another, and which overlay one another when the first and second housing halves are secured together and wherein the first housing half has a first planar inner surface and the second housing half has a second planar inner surface, and where the first planar inner surface includes a first planar wall formed in the first planar inner surface to help create the projecting portion, and the second planar inner surface has a second planar wall formed in the second planar inner surface to help create the recessed portion, and further such that upper walls of the first and second open faced channels are co-planar with their respective first and second planar walls, respectively;

disposing a porous membrane filter over the open faced channels before securing the first and second housing halves together such that the porous membrane filter is captured between the first and second open faced channels and in communication with both of the open faced channels, and wherein the porous membrane filter is shaped in accordance with a two dimensional shape of the projecting portion and the recessed portion, and has a thickness enabling the porous membrane filter to reside between the projecting portion and the recessed portion when the first and second housing halves are secured together;

flowing the first fluid in a first direction through a first inlet of the first housing half into and through the open faced channel in the first housing half such that the first fluid contacts the porous membrane filter while flowing from the first inlet to a first outlet of the first housing half, and then exits out through the first outlet, wherein the first inlet and the first outlet are formed in a first common longitudinal plane parallel to a first plane within which the first serpentine flow path is formed;

simultaneously flowing a second fluid into a second inlet of the second housing half, and in a second direction opposite to the first direction, and through the open faced channel in the second housing half such that the second fluid flows from the second inlet to a second outlet of the second housing half and communicates with the porous membrane filter while the first fluid is in contact with the porous membrane filter, and wherein the second inlet and the second outlet are formed in a second common longitudinal plane parallel to a second plane within which the second serpentine flow path is formed;

using the porous membrane filter to extract the component from the first fluid and to transfer the component to the second fluid; and continuing to flow the first and second fluids in opposing fashion in the first and second directions out from the first and second housing halves.

11. The apparatus of claim 1, wherein:

the first inlet port and the first outlet port are laterally offset from one another; and the second inlet port and the second outlet port are laterally offset from one another.

\* \* \* \* \*